US011228188B2

(12) United States Patent
Watson et al.

(10) Patent No.: US 11,228,188 B2
(45) Date of Patent: Jan. 18, 2022

(54) WIRELESS CHARGING SYSTEM AND METHOD FOR ELECTRONIC DEVICE GRIP HOLDER

(71) Applicants: David Louis Watson, Beaufort, SC (US); Melanie Leof Watson, Beaufort, SC (US)

(72) Inventors: David Louis Watson, Beaufort, SC (US); Melanie Leof Watson, Beaufort, SC (US)

( * ) Notice: Subject to any disclaimer, the term of this patent is extended or adjusted under 35 U.S.C. 154(b) by 0 days.

(21) Appl. No.: 16/720,294

(22) Filed: Dec. 19, 2019

(65) Prior Publication Data

US 2020/0203973 A1 Jun. 25, 2020

Related U.S. Application Data

(60) Provisional application No. 62/782,992, filed on Dec. 20, 2018.

(51) Int. Cl.

*H02J 7/00* (2006.01)
*H02J 50/10* (2016.01)
*H02J 7/02* (2016.01)

(52) U.S. Cl.

CPC .............. *H02J 7/0044* (2013.01); *H02J 7/02* (2013.01); *H02J 50/10* (2016.02)

(58) Field of Classification Search

CPC ....... Y02E 60/12; H02J 7/0042; H02J 7/0045; H02J 7/0044; H02J 7/0027; H02J 7/025; H02J 5/005; H02J 17/00; H01M 10/44; H01M 10/46; H01F 38/14; Y02T 90/122; B60L 11/182; G06F 1/1632

USPC .................................. 320/107, 108; 307/104

See application file for complete search history.

(56) References Cited

U.S. PATENT DOCUMENTS

| | | | | |
|---|---|---|---|---|
| 7,619,388 | B1 * | 11/2009 | Nana | H01M 2/1066 320/114 |
| 8,373,310 | B2 * | 2/2013 | Baarman | H02J 50/80 307/104 |
| 2003/0029976 | A1 * | 2/2003 | Saitoh | B60R 11/0241 248/226.11 |
| 2010/0055964 | A1 * | 3/2010 | Hayashi | H04M 1/04 439/367 |
| 2011/0006611 | A1 * | 1/2011 | Baarman | H02J 50/90 307/104 |
| 2013/0083507 | A1 * | 4/2013 | Guirlinger | F16M 13/02 361/809 |

(Continued)

FOREIGN PATENT DOCUMENTS

WO WO 2020/055560 3/2020

*Primary Examiner* — Richard Isla
*Assistant Examiner* — Mohammed J Sharief

(57) ABSTRACT

A wireless charging system includes an induction coil to generate a magnetic field attached to a housing that has a hole in a surface to accept a grip. A user inserts a grip attached to an electronic device with a receiver circuit, including a receiver coil, into the hole bringing the receiver coil into contact with the magnetic field generated by the induction coil. The magnetic field induces a current in the receiver coil which is used to charge the electronic device. In certain instances, the housing is secured to another surface by an attached mount. Moreover, in certain instances the electronic device is supported by a portion of the hole's perimeter supporting the grip or a securing mechanism holding the grip inside the hole.

20 Claims, 9 Drawing Sheets

100 310 300 130 170 330 250 140 120 220 240

(56) References Cited

U.S. PATENT DOCUMENTS

| | | | | |
|---|---|---|---|---|
| 2013/0168429 | A1* | 7/2013 | Pearce | A45F 5/021 224/676 |
| 2016/0309865 | A1* | 10/2016 | Chiang | F16M 13/022 |
| 2016/0347257 | A1* | 12/2016 | Buchanan | H04M 1/04 |
| 2017/0110902 | A1* | 4/2017 | Miller | H02J 7/0044 |
| 2017/0167669 | A1* | 6/2017 | Purkiss | H02J 50/10 |
| 2017/0302098 | A1* | 10/2017 | Miller | H02J 7/0042 |
| 2018/0062417 | A1* | 3/2018 | Choi | H02J 7/0045 |

* cited by examiner

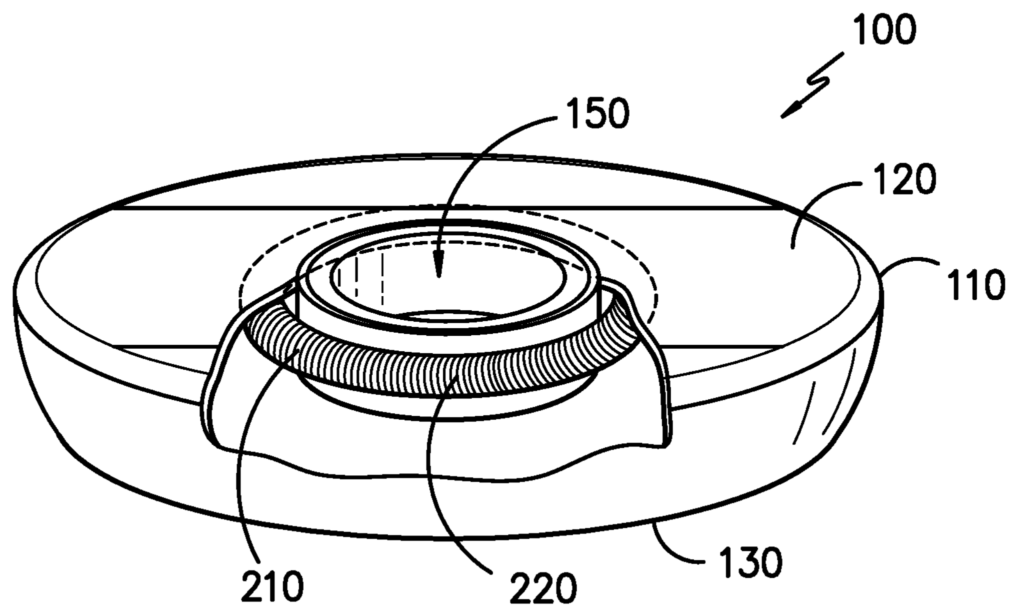
FIG. -1-
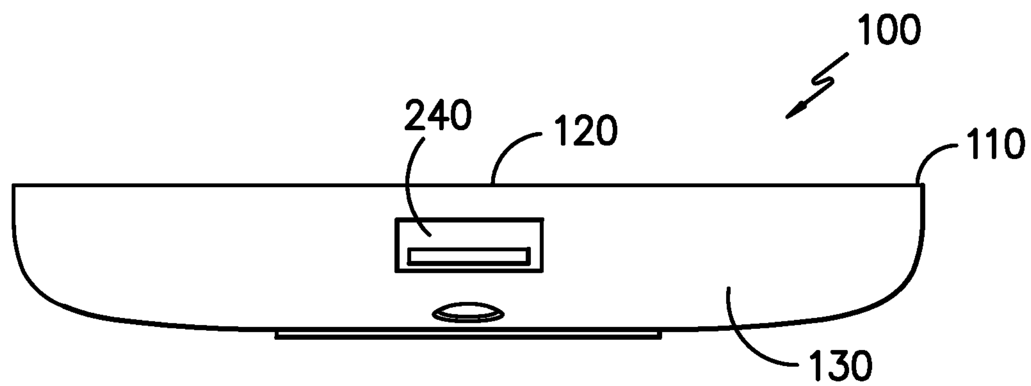
FIG. -2-
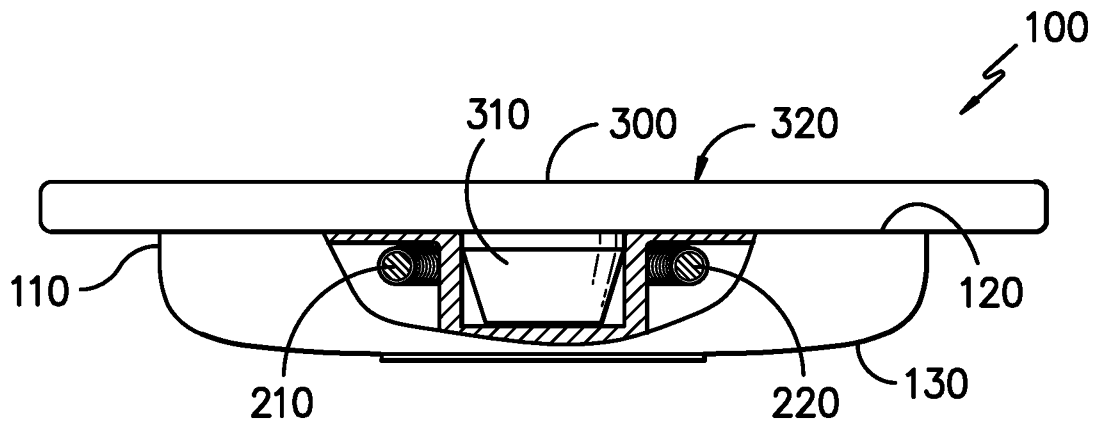
FIG. -3-

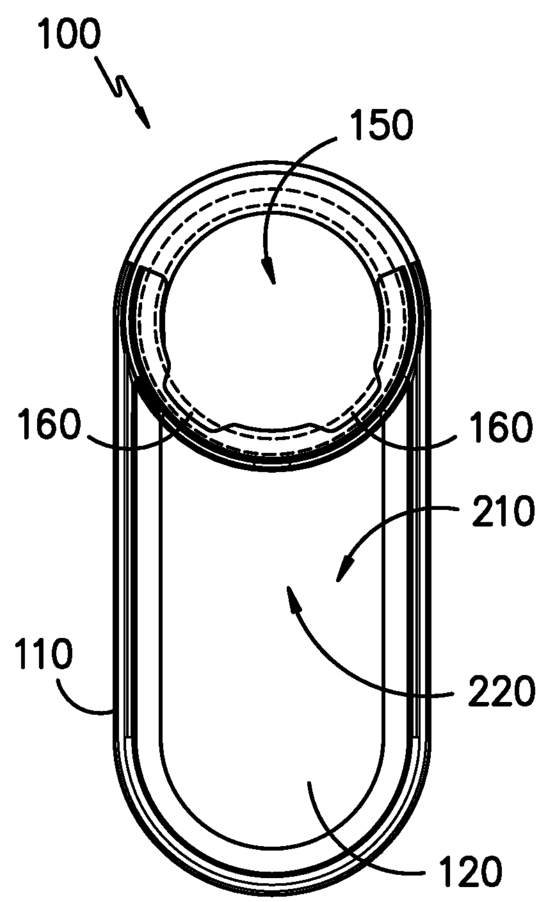
FIG. -4-
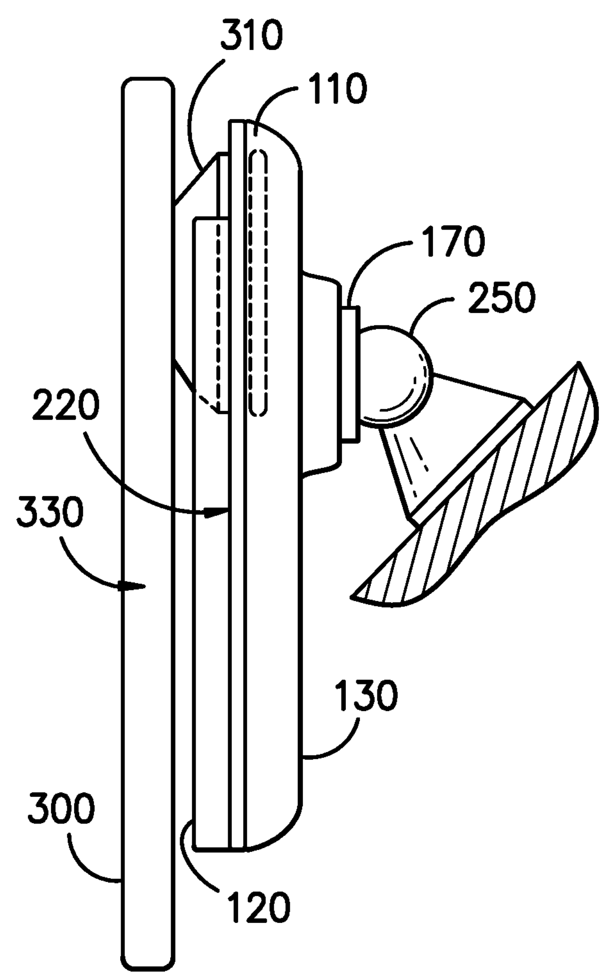
FIG. -5-

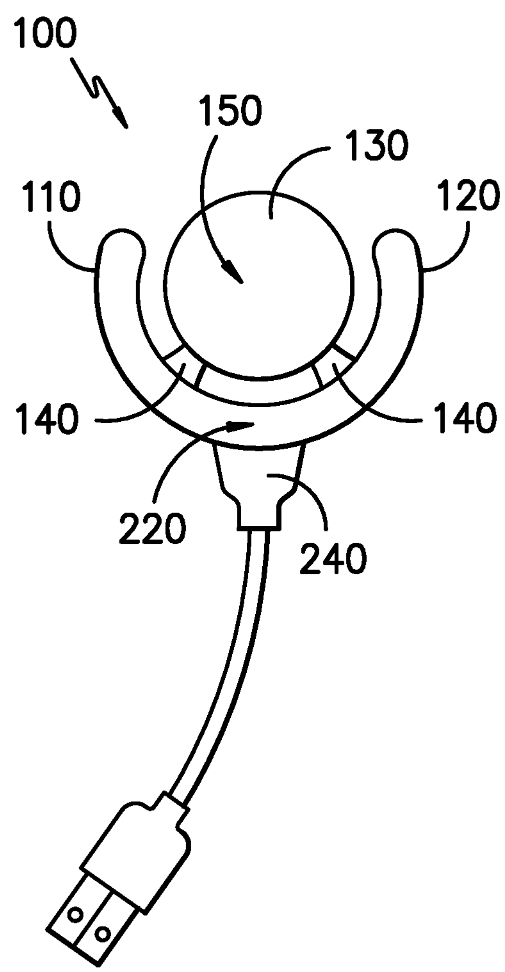
FIG. -6-
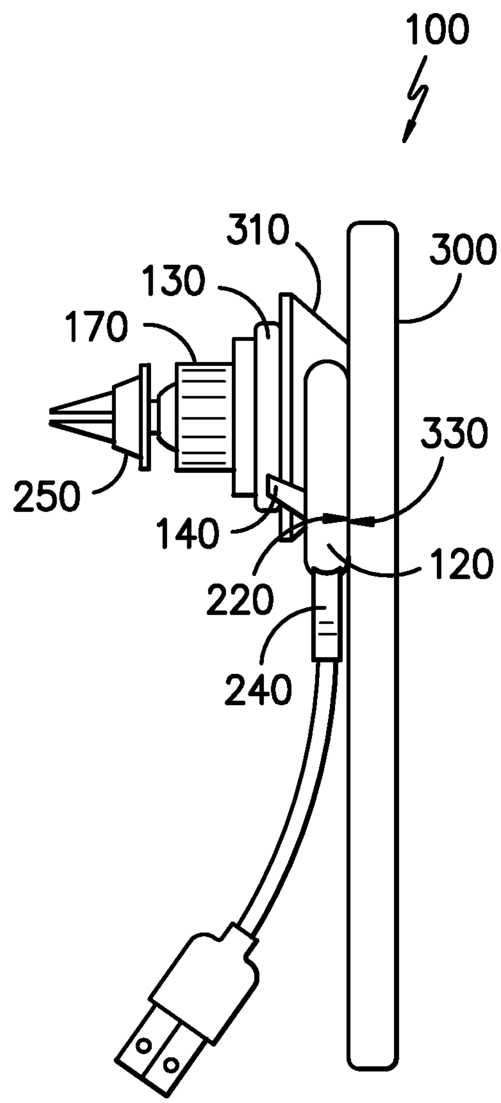
FIG. -7-

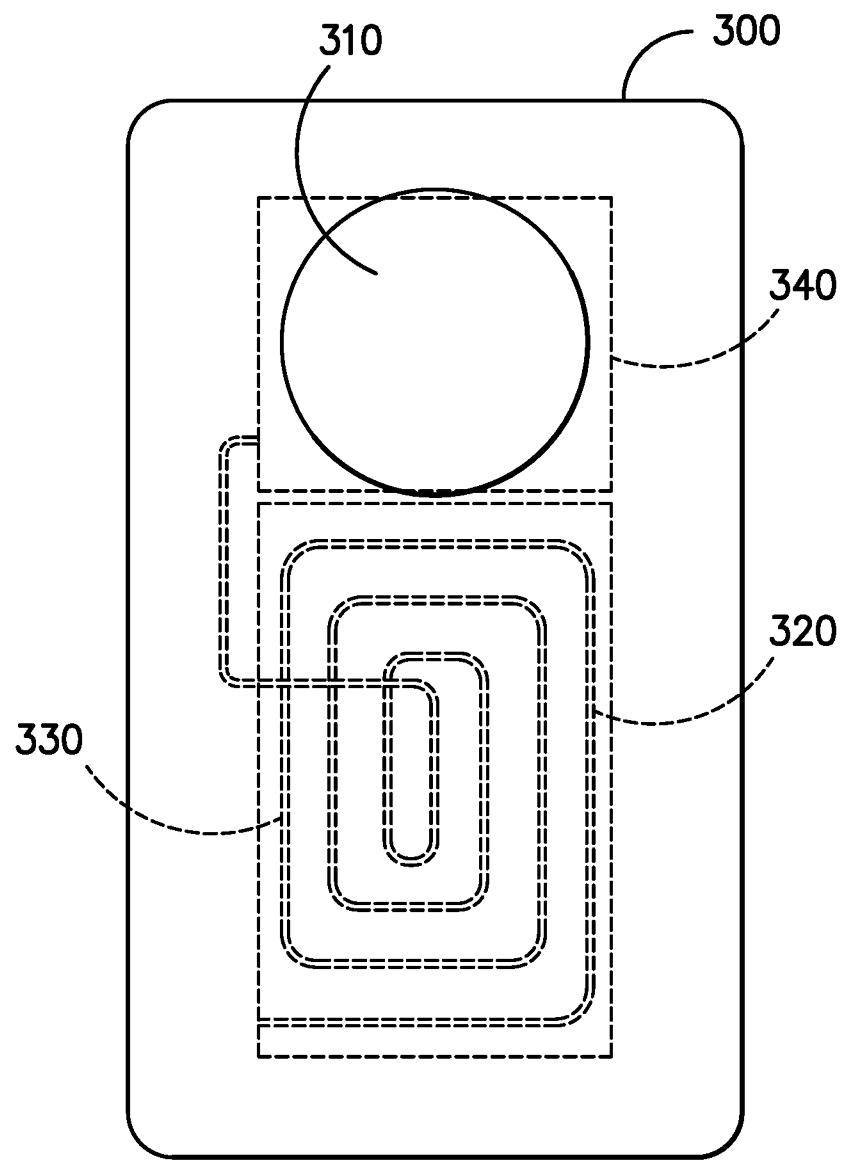
FIG. -7A-

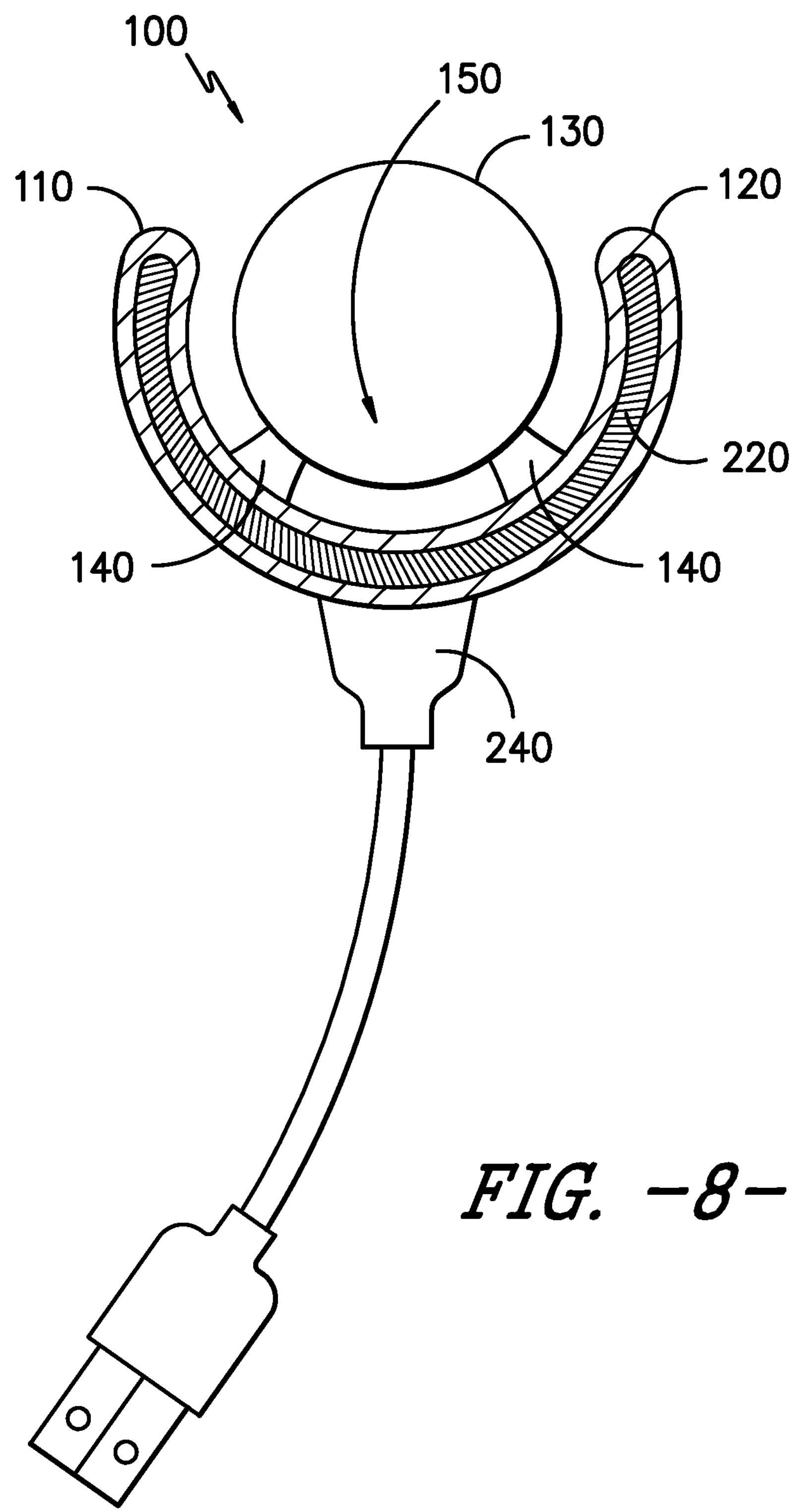
FIG. -8-

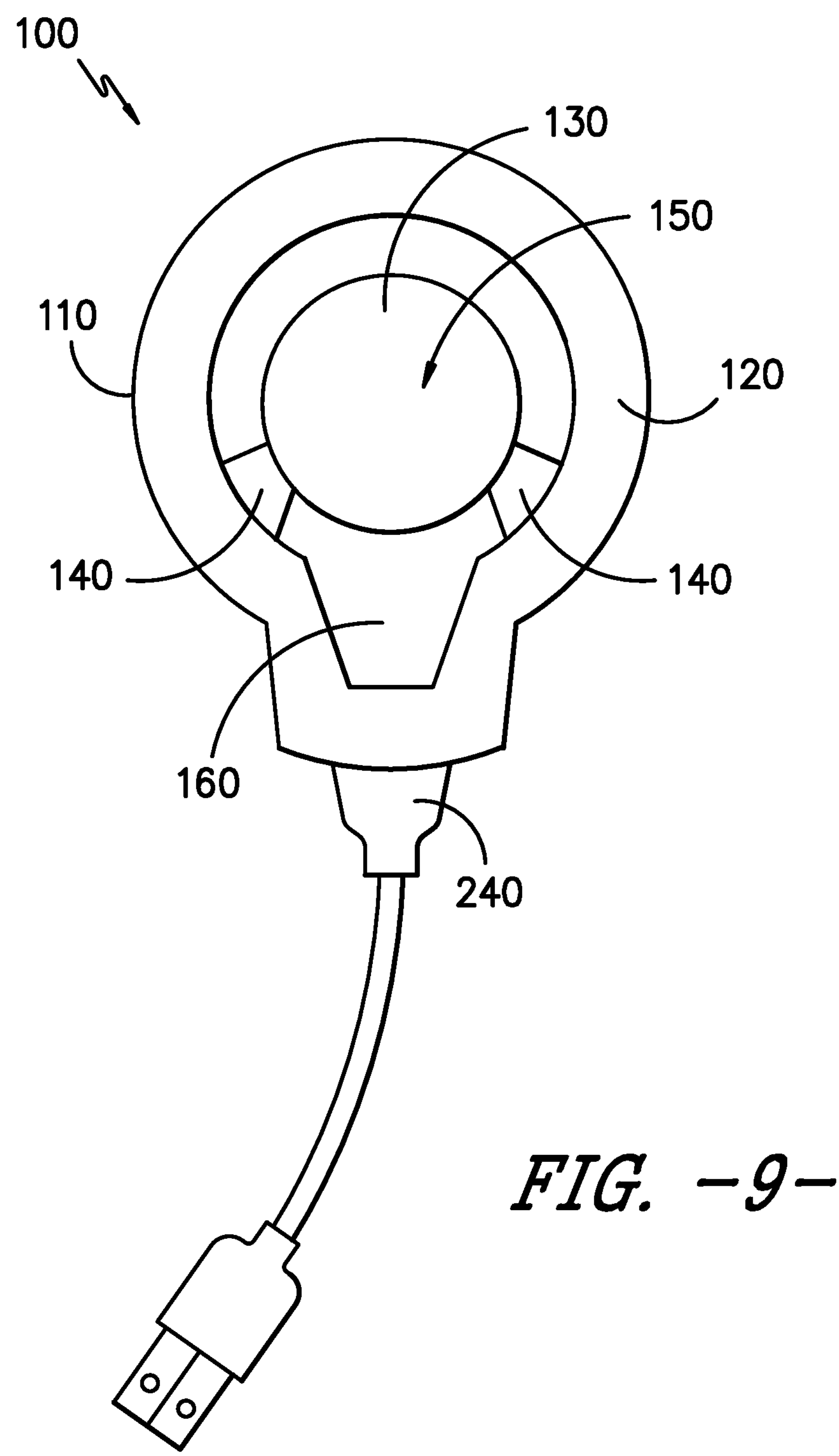
FIG. -9-

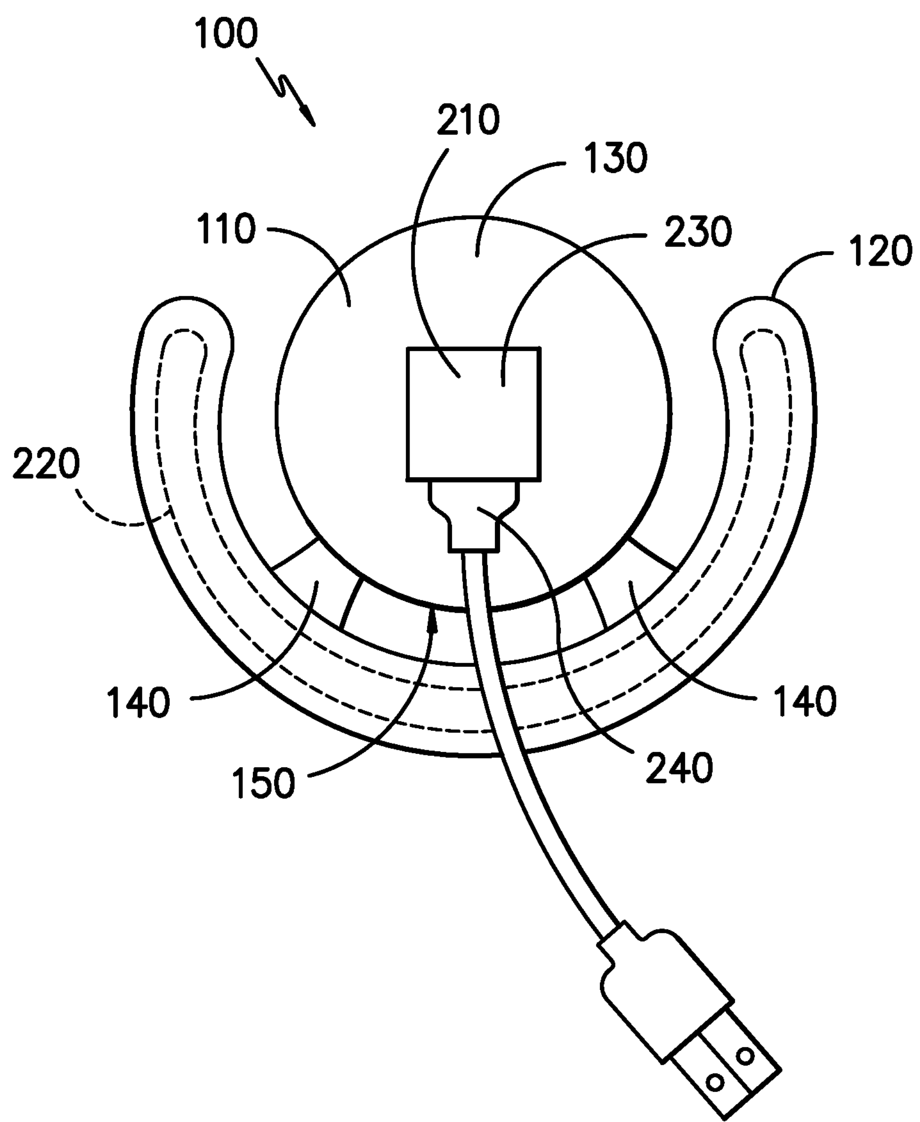
FIG. -10-

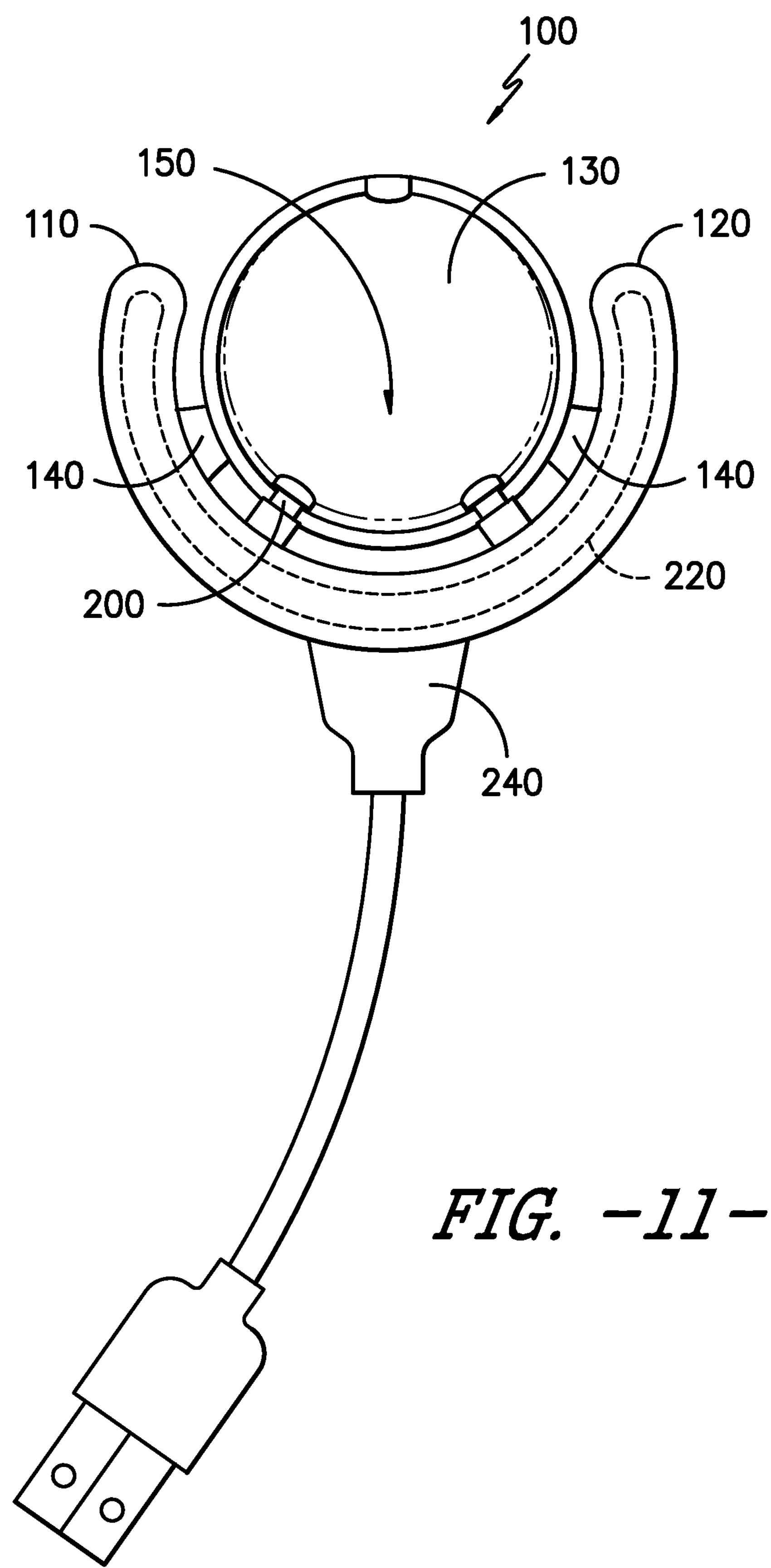
FIG. -11-

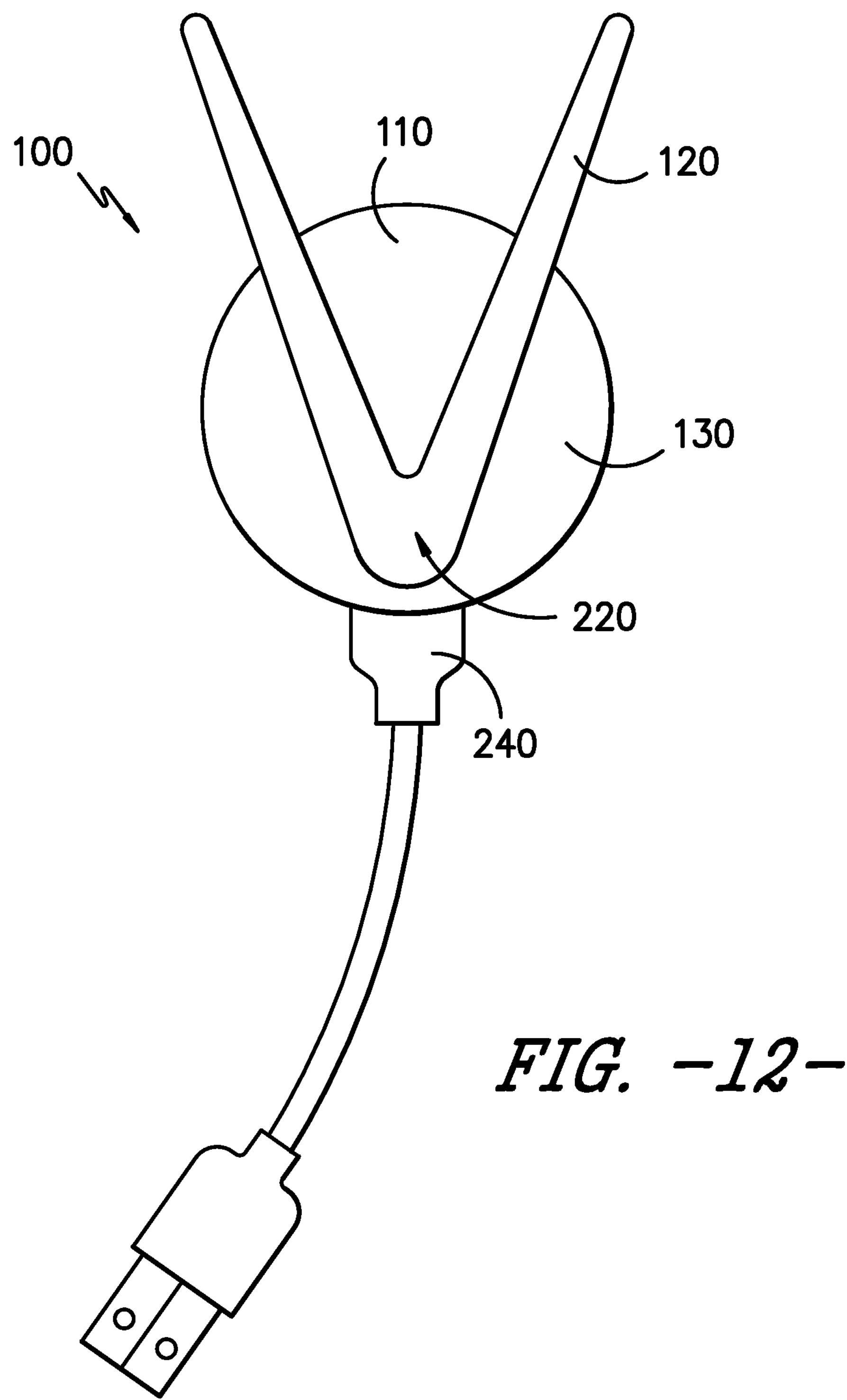
FIG. -12-

WIRELESS CHARGING SYSTEM AND METHOD FOR ELECTRONIC DEVICE GRIP HOLDER

CROSS-REFERENCE TO RELATED APPLICATION

This application claims the benefit of U.S. Provisional Application No. 62/782,992, entitled WIRELESS CHARGING SYSTEM AND METHOD FOR ELECTRONIC DEVICE GRIP HOLDER, filed on Dec. 20, 2018 which is hereby incorporated by reference in its entirety.

BACKGROUND OF THE INVENTION

Wireless charging has become a prevalent trend for mobile electronic devices. The use of wireless charging provides a substantial benefit, eliminating the need to connect wires or cords directly to a device for it to recharge. As such, wireless charging can help prevent damage to a device's ports due to repeated wear or misuse and circumvent the need for one or more varieties of cords or cables. Wireless charging generally works by passing current through an inductor coil, typically within a charging stand or base, to create an electromagnetic field which can be used to induce current in a receiving coil within proximity of the magnetic field, typically within an electronic device. However, the strength of the magnetic field drops sharply with distance. Therefore, although a user can avoid having to directly connect wires or cords to an electronic device, the receiving coil within the electronic device must be sufficiently close to the inductor coil. Indeed, even the use of protective cases can impede the ability of the magnetic field to transfer voltage to the receiving coil if they are particularly thick or interfere with the magnetic field in some other way.

Further, the use of hand grips affixed to the back of mobile electronic devices has also become a prevalent trend. Examples of such grips include those sold under the POPSOCKETS® brand, including those sold under the POPGRIP® label and described in U.S. Pat. No. 9,958,107. Generally, these grips are applied to the back surface of an electronic device or a case for an electronic device. These grips are generally utilized as an aid to a user holding or grasping a device or to prop a device at an angle from a table or other surface. These grips may also be used with an additional mounting device to secure the electronic device when not being held by a user. During such use, the mounting device is generally secured to the grip directly, such as by surrounding and frictionally engaging the grip. Thereby, the electronic device may be held in place through engagement of the grip affixed thereto.

However, these grips often impede wireless charging of electronic devices by creating too much separation between the inductor coil and receiving coil. It is therefore common for users to have to remove grips or cases with grips affixed to wirelessly charge an electronic device and for users to be unable to mount or secure an electronic device by the grip during wireless charging. However, removal of such elements increases the likelihood they will be lost and provides an inconvenience. Further, the inability to mount or secure an electronic device by its grip during charging is also unfavorable. Consequently, it would be advantageous to provide a device, system, or method which, in one or more aspects, provides wireless charging to electronic devices without requiring removal of a grip or case to which a grip is affixed and provides wireless charging during mounting or securing an electronic device by an affixed grip.

BRIEF SUMMARY OF THE INVENTION

The present invention is directed to a wireless charging system and method that, in one or more aspects, provides wireless charging to electronic devices, with receiver circuits including a receiver coil, and an attached grip or case with a grip, and provides wireless charging during the mounting or securing of an electronic device by an affixed grip. In accordance with one embodiment, the wireless charging system has a housing with a hole, or opening, in one surface and an induction coil inside. When a grip, attached to an electronic device, is inserted into the opening, a receiver coil inside the electronic device is brought closer to the induction coil so the receiver coil is in contact with the magnetic field generated by the induction coil during operation. The magnetic field generated by the induction coil induces current in the receiver coil.

To operate the induction coil, it is connected to a power supply, like an AC or DC power outlet, a battery, or the like. In certain embodiments, the power supply is removably connected. Also, in certain embodiments, the induction coil is part of a larger transmitter circuit including a controller module, power amplifier, inverter, or other components, as desired, to control and condition the current sent to the induction coil to generate a magnetic field. A controller module can be utilized to adjust the current supplied to the coil or even shut it off, also adjusting the magnetic field.

To receive the magnetic field, the electronic device has a receiver coil, part of a broader receiver circuit, to take the current induced in the receiver coil and use it to charge the electronic device. In certain embodiments, the receiver circuit includes a rectifier, converter, regulator, controller, signaler, or other components, as desired, to control and condition the current induced in the receiver coil. A controller can be utilized to break the connection in the receiver circuit, stopping charging. Similarly, a signaler can be used to indicate to the transmission circuit that charging is or is not desired based on the condition of the battery to be charged or other factors.

Moreover, in certain embodiments, the electronic device may be supported and/or held in place by its attached grip. For example, in one embodiment, the grip may rest on and be supported by a portion of the hole's perimeter, after the grip is inserted into the hole. Further, the grip may be removably secured within the hole, as with a spring-loaded clamp, hook and loop fastener, adhesive fastener, or the like. Thereby, the housing and electronic device may be removably connected to help ensure wireless charging. Also, in certain embodiments, the housing may also be removably affixed to or integrally connected with an anchor mount which can itself removably affix to a surface, like an automotive cupholder, dash, vent, or windshield. Thereby, the housing, and any removably attached electronic device may be mounted in a desirable location while still charging such device, with its attached grip.

In accordance with at least one embodiment, a user mounts the housing of the wireless charger to a surface through the anchor mount and connects the transmitter circuit to a power supply, readying the system to accept an electronic device for charging. A user then takes the electronic device—having a receiver circuit and attached grip—and inserts the grip into a hole on the surface of the housing. Once inserted, the receiver coil of the electronic device's receiver circuit contacts the magnetic field of the induction coil and a current is induced therein to charge the electronic device. The grip then may be secured or supported in place to hold the electronic device in a desired position.

BRIEF DESCRIPTION OF THE DRAWINGS

These and other features, aspects, and advantages of the present invention will become better understood with regard to the following description, appended claims, and accompanying drawings where:

FIG. 1 is a perspective view of one embodiment of a wireless charging system having a housing formed of front and rear surface members with a circular opening in a central portion of the front surface member and an induction coil affixed within the housing;

FIG. 2 is a side elevation view of one embodiment of a wireless charging system including a USB charging port which a user can use to power the induction coil within the housing;

FIG. 3 is a side elevation view of one embodiment of a wireless charging system with a cut away portion to show an electronic device resting on the housing with its grip inserted into the opening so the receiver coil inside the electronic device and the induction coil inside the housing are brought closer together, allowing for increased inducement of current in the receiver coil;

FIG. 4 is a front elevation view of one embodiment of a wireless charging system with an elongated oval housing to better match the shape of certain electronic devices and the opening having extending protrusion sections to better facilitate insertion and security of a variety of grips;

FIG. 5 is a side elevation view of one embodiment of a wireless charging system having an anchor member adjustably affixed to an anchor receiver along the rear surface element and with the grip of an electronic device inserted through the opening in the front surface element to be supported and held therein;

FIG. 6 is a front elevation view of one embodiment of a wireless charging system with an open housing having a u-shaped front surface element affixed to a circular rear surface element through bridge members so a cradle space for the grip of an electronic device is created between the front and rear surface elements and bridge members and with a USB cable for powering the induction coil therein;

FIG. 7 is a side elevation view of one embodiment of a wireless charging system with a clamp anchor member removably affixed to an anchor receptacle and an electronic device mounted therein by insertion of its grip within the cradle area created between a u-shaped front surface element, rear surface element, and bridge members so that the receiver coil within the electronic device is disposed close to the induction coil within the front surface element;

FIG. 7A is a rear elevation view of one embodiment of an electronic device having a grip and an interior receiver coil which could be used with one embodiment of wireless charging system;

FIG. 8 is a front elevation view of one embodiment of a wireless charging system with an open housing having a u-shaped front surface element cut away so that the induction coil within may be seen;

FIG. 9 is a front elevation view of one embodiment of a wireless charging system with an open housing having a front surface element fully enclosing an opening and with an extending protrusion section into which the grip of an electronic device may slide and be further secured;

FIG. 10 is a rear elevation view of one embodiment of a wireless charging system having a removable USB cable affixed to a power on the rear surface element to supply current from the power source to an interior induction coil within the front surface element;

FIG. 11 is a front elevation view of one embodiment of a wireless charging system having a securing mechanism to hold and further secure the grip of an electronic device once inserted into the opening; and FIG. 12 is a front elevation view of one embodiment of a wireless charging system having a v-shaped front surface element which creates a cradle area with the rear surface element into which the grip of an electronic device may be wedged to be secured and where the induction coil is located within the front surface element.

REFERENCE NUMERALS

| | | | |
|---|---|---|---|
| 100 | Wireless Charging System | 110 | Housing |
| 120 | Front Surface Element | 130 | Rear Surface Element |
| 140 | Bridge Member | 150 | Opening |
| 160 | Opening Extension Section | 170 | Anchor Receiver |
| 200 | Securing Mechanism | 210 | Transmitter Circuit |
| 220 | Induction Coil | 230 | Controller Unit |
| 240 | Power Source Cable | 250 | Anchor Mount |
| 300 | Electronic Device | 310 | Grip |
| 320 | Receiver Circuit | 330 | Receiver Coil |

DETAILED DESCRIPTION OF THE INVENTION

With reference now to the drawings, a wireless charging system 100 and method for wirelessly charging an electronic device 300 having a receiver coil 330 and an attached grip 310—without removal of the grip 310—are herein described.

First Representative Embodiment of the System

As in FIGS. 1-3, a first embodiment of the wireless charging system 100 includes a housing 110 formed of a front surface element 120 and rear surface element 130 attached together. The housing 110 also includes a circular hole, or opening, 150 in the front surface element 120 to accept a grip 310 attached to an electronic device 300, such as a cell phone. The system 100 also includes an induction coil 220 within the housing 110, attached adjacent the front surface element 120. The induction coil 220—generally a coil of wire around an iron core—is part of a transmitter circuit 210, potentially including a controller unit 230—as in FIG. 10—to allow current from a power source 240 to be adjustably applied to the induction coil 220.

When current is applied to the induction coil 220, a magnetic field is created which can induce a current in a receiver coil 330 within an electronic device 300, as that in FIG. 7A. To facilitate the induction of current in the receiver coil 330, the grip 310 affixed to the electronic device 300 can be inserted in the opening 150, as in FIG. 3. Insertion of the grip 310 allows the electronic device 300 to rest adjacent the front surface element 120 and disposes the receiver coil 330 in contact with the magnetic field generated by the transmitter coil 220. Without utilizing the opening 150, the grip 310 would cause separation between the induction coil 220 and receiver coil 330, reducing, or wholly preventing, current from being induced in the receiver coil 330 without removal of the grip 310.

Moreover, insertion of the grip 310 into the opening 150 reduces the likelihood that the electronic device 300 will be inadvertently removed from the wireless charging system 100, removing the receiver coil 330 from the magnetic field. To further secure both the device 300 and system 100, the housing 110 has a cylindrical shape and the rear surface element 130 has a high friction, anti-skid coating along a portion. Thereby, this first embodiment of the system 100 and electronic devices 300 used with it are resistant to inadvertent movement while still retaining the ability to be moved, when desired. Generally, this first embodiment would be considered maximally useful on a generally stationary surface where forceful movements would be unlikely to affect the system 100 and electronic device 300. However, it is foreseen that this first embodiment may be utilized in virtually any context desired.

First Representative Embodiment of a Method of Use

In a first embodiment, a method for wirelessly charging an electronic device 300 with an attached grip 310 and receiver coil 330, without removal of the attached grip 310 involves a wireless charging system 100 having a housing 110 with an opening 150 through a surface thereof and a transmitter circuit 210, including an induction coil 220, attached thereto, like shown in FIGS. 1, 3, 8, 10, and 11. A user applies current to the induction coil 220 through the transmitter circuit 210, creating a magnetic field. The user then inserts the grip 310 into the opening 150, bringing the electronic device 300 into contact or adjacent to a surface of the housing 110 and the receiver coil 330 of the electronic device 300 into contact with the magnetic field of the induction coil 220, like in FIGS. 3, 5, and 7. Thereby, the magnetic field induces a current in the receiver coil 330, which a user may utilize, through a receiver circuit 320, to charge the electronic device 300—without removal of the attached grip 310.

Alternative Representative Embodiments

In an alternative embodiment shown in FIGS. 4, and 5, the housing 110 may also include an anchor receiver 170 along the rear surface element to removably and adjustably attach to an anchor mount 250. Thereby, the housing 110 may be mounted and secured to a variety of surfaces by use with one or more different accommodating anchor mounts 250. In addition, the housing 110 may have a more elongated ovular shape to more closely match the shape of an electronic device 300, reducing the relative size and enhancing the aesthetics of the system 100 overall. The opening 150 in the front surface element 120 may also be also have a different shape, including one or more open extending protrusion sections 160 extending away from the opening 150 generally into which the grip 310 slide to accommodate different shaped grips 310 or to allow a grip to be further secured after insertion through the opening 150.

In instances where the grip is being further secured as above, the grip 310 may be prevented from rotating around the opening 150, thereby preventing the electronic device 300, and its receiver coil 330 from moving out of contact with the magnetic field of the induction coil 220. Generally, this alternative embodiment of the system 100 would be considered maximally useful in a context where securing the system 100 and electronic device 300 is desired, such as when the system 100 and device 300 would be likely to encounter forceful movements that could cause separation. For example, this alternative embodiment may be considered maximally useful in an automobile. However, it is foreseen that this embodiment would be considered equally useful in virtually any context, such as being mounted to a wall or table, as the adjustable attachment of the anchor unit 250 could allow for enhanced positioning of the device 300 in a variety of viewing angles.

In a further embodiment shown in FIGS. 6, 7, and 8, the front surface element 120 and rear surface element 130 may be attached by bridge members 140 to create a less enclosed housing 110 to that of the embodiments of FIGS. 1-5. The less enclosed housing 110 may provide an advantage in aesthetics, lower weight, and smaller size, should they be desired. In such embodiment, the arrangement of the surface elements 120, 130 and bridge members 140, creates a cradle area for a grip 310 inserted through the opening 150 to be securely held. To accommodate the easy insertion of a grip 310, the opening 150 of such embodiment may be partially enclosed, only having a partial perimeter of the front surface element 120 as in FIGS. 6, 7, 8, 10, 11, and 12. However, it is foreseen that the opening 150 may be fully enclosed, having a full perimeter within the front surface element 120 as in FIG. 9, should it be desired.

The induction coil 220, and possibly the entire transmitter circuit 210, may be disposed inside one or more of the front surface element 120, rear surface element 130, and bridge members 140. Indeed, placement of the induction coil 220 within the front surface element 120 would be maximally effective in such an embodiment, providing protection to the coil 220 itself and allowing it to be located near the receiver coil 330 of an electronic device 300. However, it is possible that the induction coil 220 is located within either of the bridge members 140 or rear surface element 130, if the receiver coil 330 would still be in contact with the magnetic field generated by the induction coil 220 during use. Additionally, any other elements of the transmitter circuit 210 could be located within an attached device, such as along the cable from the power source 240, instead of within portions of the housing 110.

Alternative Representative Methods of Use

In additional embodiments, the method of use of the wireless charging system 100 can also involve securing the attached grip 310 of an electronic device 300 to the housing 110, as with the securing mechanism shown in FIG. 11. Thereby, the electronic device 300 may be secured so its receiver coil 330 remains within the magnetic field generated by the induction coil 220, ensuring consistent charging and preventing unintended movement. In order to secure the electronic device 300, a grip 310 is inserted into the opening 150 of the housing 110 to be frictionally engaged by a securing mechanism 200. For example, a spring-loaded clamp attached to the housing within the opening 150, as in FIG. 11, could clamp to a grip 310 inserted through the opening 150. Moreover, the grip 310 may be secured in or freed from the opening 150 automatically or manually. For example, a grip 310 may be manually secured or freed through activation of a button on an outer portion of the housing 110 and operatively connected to a securing mechanism 200.

Also, in additional embodiments, the method of use of the wireless charging system 100 can involve securing the housing 110 to a mounting surface. For example, a user could mount the system 100 to the dashboard or windshield of a car through a suction cup attachment, like that of FIG. 5 or to an automotive vent though a clip, like that of FIG. 7. Attachment to a particular surface may be achieved through an appropriate anchor mount 250 attached to the housing 110. In certain embodiments, the anchor mount 250 removably affixes to an anchor receiver 170 on the housing 110 or is integrally formed with the housing itself 110. Thereby, the system 100 may be held stationary during charging.

In various embodiments, a system 100 may have both a securing mechanism 200 and anchor mount 250 or just one of them. For example, the system 100 may be mounted through an anchor mount 250 and just allow the grip 310 to be held by insertion through the opening 150 and nesting of the grip 310 within an extended section of the opening 150, without having a separate securing mechanism 200, as in FIG. 7.

Variations-Elements

Housing

While the housing 110 above has been previously described as being an enclosed cylindrical or elongated ovular shape or as being less enclosed, other variations of both shape and construction are possible. Indeed, it is foreseen that almost limitless variations on the shape of the housing 110 may be utilized. For example, the housing 110 may have a pentagon, hexagon, octagon, circular, oval, square, or other shape cross-section to more closely match the shape of an electronic device or for other utility or aesthetic reasons. Similarly, it is foreseen that the housing 110 may be virtually any size. Indeed, a large housing 110 may be desired to facilitate a large electronic device 300 while a smaller housing 110 may be more useful with a smaller electronic device or mounted in an area where a large housing 110 wouldn't fit or would be considered too unwieldly.

While discussion has been given to the shape and size of the housing 110 as a whole, it is also foreseen that the front and rear surface elements 120,130 may independently have unlimited variations of shape and size as well. For example, in certain embodiments the front surface element 120 may be u-shaped, as in FIG. 6 and in others it may be v-shaped, as in FIG. 12, circular, as in FIG. 1, or ovular, as in FIG. 4. The shape of the front surface element 120 may be influenced by the configuration, shape or size of the induction coil 220 or the shape of the electronic device 300 and location of its receiver coil 330 to interact with the transmitter circuit 210. Moreover, the front surface element 120 may also engage the grip 310 directly to secure it, as when a grip 310 is inserted into the v-shaped front surface element 120 of FIG. 12. To accommodate the engagement of the grip 310, the front surface element 120 may be made of or with a flexible material, so the grip 310 more securely wedges between portions thereof.

Similarly, the rear surface element 130 may be virtually any shape and size. For example, the rear surface element of FIG. 2 is circular and of FIG. 4 is ovular. Moreover, the rear surface element 130 may be shaped and sized to generally match the front surface element 120, as in FIGS. 2 and 4, or be shaped and sized independently, as in FIGS. 6-12. The shape and size of the rear surface element 130 may be influenced by the shape or size of the anchor mount 250.

Moreover, in various embodiments, the front surface element 120 and rear surface element 130 may be attached together by one or more bridge members 140 to form the housing 110. For example, in FIG. 4 a single bridge member 140 forms a perimeter wall around the housing 110, thereby enclosing it. Alternatively, in FIG. 6, multiple bridge members 140 affix the front surface element 120 to the rear surface element 130, creating a cradle area in which the grip 310 may rest and be wedged. The number and shape of the bridge members 140 may be varied to accommodate various shape and sized grips 310. However, it is also foreseen that the housing 110 may be formed of front and rear surface elements 120, 130 affixed together directly, without any bridge members 140, as in FIG. 1.

Also, while the induction coil has been described as being attached to the housing 100 under the front surface element 120, it is foreseen that the induction coil 220 may be affixed to or within virtually any portion of the housing 110 which still allows the magnetic field to induce a current during operation. For example, the induction coil 220 may be fully enclosed within the front surface element 120, as in FIGS. 8-12. Also, the induction coil 220 may be located just underneath the front surface element 120, as in FIG. 1 or on an outer portion of the front surface element 120. While these locations may provide benefits to the operation of the system 100, it is foreseen that in certain circumstances the induction coil 220 may also be disposed adjacent the rear surface element 130 or bridge members 140, within or outside the housing 110 itself.

Additionally, while the descriptions of the front and rear surface elements 120, 130 have addressed these portions as separate elements of the housing 110, it is also foreseen that the front and rear surface elements 120, 130 may also be integrally formed, so that that each element is effectively just an outer surface of the same element making up the housing 110. In such instances, the housing 110 could generally appear as a plate or disc having an opening 150 through its entirety and the front surface element 120 and rear surface element 130 would merely be a front outer surface and rear outer surface of the housing 110, respectively.

Opening

While the opening 150 has been discussed in FIGS. 1-3, 6-8, and 10-11 as an enclosed circular or open semi-circular shape, and in FIGS. 4-5 and 9 as having more or more sections 160 extending away therefrom, it is foreseen that the opening 150 may be virtually any shape. Indeed, it is foreseen that the opening 150 may have a pentagon, hexagon, octagon, or other shape to accommodate different shaped and sized grips 310. Also, the opening 150 may be triangular, and open on a side, as in FIG. 12. Moreover, it is foreseen that the opening 150 may provide a channel through the entire housing 110—having an opening on the rear surface element 130—or only partially through the housing 110 to accommodate the insertion of the grip 310.

Anchor Receiver/Mount

In certain embodiments, the system 100 includes both an anchor receiver 170 and anchor mount 250 or just an integrally formed anchor mount 250 to secure the system 100 to a mounting surface. In either instance, the choice of anchor mount 250 secured to the housing 110 may be based on the mounting surface. For example, a system 100 may utilize a suction cup anchor mount 250 to affix the housing 110 to a windshield, dashboard, or other flat surface—as in FIG. 5. Alternatively, a clamp anchor mount 250 may be utilized to affix the housing 100 to an automotive vent, table edge, or the like—as in FIG. 7. However, it is foreseen that the anchor mount 250 may involve other attachment mechanisms useful to affix the housing 110 to various mounting surfaces. Indeed, there are many mechanisms for providing attachment to a particular surface and one skilled in the art should recognize that any suitable means for such may be employed.

Moreover, in certain embodiments, the anchor mount 250 is removably attached to the housing 110, as in FIG. 7. It is foreseen that, in removable embodiments, the anchor mount 250 may be removably affixed to the housing 110 through a mating anchor receiver 170. The anchor receiver 170 may be located on a portion of the housing 110, such as the rear surface element 130—as in FIG. 7. Thereby, the anchor receiver 170 may provide for easy assembly and mounting of the system 100 to a mounting surface. It is also foreseen that in certain embodiments, the anchor member 250 may be angularly adjustable with respect to the housing 110 to allow adjustment of the housing 110, and thereby the electronic device 300, to an optimal angle, as in FIG. 5. Moreover, affixing the system 100 to a mounting surface may help provide more reliable wireless charging and better ability to secure the electronic device 300 by the grip 310 overall. The ability to secure the system 100 and an electronic device 300 to a mounting surface may be considered desirable in a variety of circumstances, such as in a moving vehicle where inadvertent movement may interfere with wireless charging otherwise.

Securing Mechanism

Similar to the ability to secure the housing 110 to a particular mounting surface, it is foreseen that—in certain embodiments—the system 100 may also include a securing mechanism 200 to engage and hold a grip 310 when inserted into the opening 150, as in FIG. 11. While the securing mechanism 200 has previously been described as a spring-loaded clamp, it is foreseen that many other securing mechanisms may be utilized. For example, the securing mechanism may be a clamp or grip utilizing a hydraulic mechanism or resilient plastic or rubber pieces to hold the grip 310 within the opening 150 once inserted. Additionally, it is foreseen that the securing mechanism 200 may involve adhesive, hook and loop fasteners, or the like. Indeed, there are many mechanisms for providing such removable attachment between two elements and one skilled in the art should recognize that any suitable means for providing such may be employed. Additionally, it is also foreseen that the securing mechanism 200 may also involve a button, latch, switch, or other device to control the securing mechanism 200. Thereby, activation of such would provide selective easy securement of the grip 310 within the opening 150 and easy removal when desired.

Transmitter/Receiver Circuits

While the induction coil 220 has been described in previous embodiments as being part of a larger transmitter circuit 210 having a controller unit 230 and being affixed to a power source 240, it is to be understood that such description provides a convenient abstraction, describing the essential functioning of the transmitter circuit 210 and its induction coil 220 relative to the system 100. However, it is foreseen that the controller unit 230, like that of FIG. 10, may have one or more additional elements to convert and control current from the power source 240, such as a power amplifier or inverter. Thereby, current supplied to the induction coil 220 may be conditioned to be most useful in creating a particular magnetic field. There are many elements necessary and optionally useful to the conditioning and control of current through a coil to create a magnetic field and one skilled in the art should recognize that any suitable elements for providing such may be utilized.

Similarly, the receiver coil 330 in an electronic device 300 is also described as being of a larger receiver circuit 320 to charge the battery 340 of an electronic device 300 with current induced in the receiver coil 330. This also is to be understood as a convenient abstraction to allow description of the essential functioning of the receiver circuit 320 and its receiver coil 330. The receiver circuit 320, shown in FIG. 7A, may have one or more elements to convert and control current induced in the receiver coil 330 to be useful for charging an electronic device 300. For example, the receiver circuit 320 may include a rectifier, converter, regulator, controller, or signaler. Indeed, there are many such elements and one skilled in the art should recognize that any suitable elements for providing such may be utilized.

Power Source

While a power source 240 is not necessary for the system 100 or electronic device 300 to be secured and mounted, a power source 240 would certainly be useful for wireless charging of an electronic device 300 with the system 100. Though the power source 240 may be a basic wall socket, tapping into the alternating current of the electrical grid, it is foreseen that the power source 240 may also include batteries, automotive power ports, and USB ports. Indeed, in cases where batteries are utilized, it is foreseen that the housing 110 may include space for the batteries. Thereby, the system 100 may be portable and require even fewer charge cables. In other cases, a cable may carry the current from a source point into to system 100 through a connection point on the housing 110 that is connected to the transmitter circuit 210. It is foreseen that this connection may be removable, allowing for the changing of the cable 240 when such cable wears out and removal of power from the system when unnecessary or undesired.

The term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also one or more other components.

Although the present invention has been described in considerable detail with possible reference to certain preferred versions thereof, other versions are possible. Therefore, the spirit and scope of the appended claims should not be limited to the description of the preferred versions contained herein. All features disclosed in this specification may be replaced by alternative features serving the same, equivalent or similar purpose, unless expressly stated otherwise. Thus, unless expressly stated otherwise, each feature disclosed is one example only of a generic series of equivalent or similar features. Further, it is not necessary for all embodiments of the invention to have all the advantages of the invention or fulfill all the purposes of the invention.

In the present description, the claims below, and in the accompanying drawings, reference is made to particular features of the invention. It is to be understood that the disclosure of the invention in this specification includes all possible combinations of such particular features. For example, where a particular feature is disclosed in the context of a claim, that feature can also be employed, to the extent possible, in aspects and embodiments of the invention, and in the invention generally.

Also, although the description above contains many specificities, these should not be construed as limiting the scope of the embodiments but as merely providing illustrations of some of several embodiments. Thus, the scope of the embodiments should be determined by the appended claims and their legal equivalents, rather than by the examples given.

What is claimed is:

1. A wireless charging system to charge an electronic device, wherein the electronic device comprises a receiving coil and a protruding grip unconnected to a power supply for said electronic device, wherein said grip has a first end, the surface area of which is affixed flush to a surface of said electronic device, and a second distal end disposed opposite said first end at a distance from said surface of said electronic device, said system comprising:

a housing having a first surface element and second surface element affixed together;

a transmitter circuit comprising an induction coil wherein said induction coil is affixed to a portion of said housing; and an opening defined by said first surface element to accept said grip so at least a portion of said grip is disposed in a cavity recessed into said housing, at least a portion of said electronic device surface is disposed adjacent said first surface, said grip is not disposed between said receiving coil and said induction coil, and said receiving coil is disposed within the generated electromagnetic field of said induction coil during operation.

2. The wireless charging system of claim 1, further comprising a power source connected to said transmitter circuit to electrify said induction coil.

3. The wireless charging system of claim 2, wherein said power source is removably connected to said transmitter circuit.

4. The wireless charging system of claim 2, wherein said transmitter circuit further comprises a controller unit to adjust the magnetic field generated by said induction coil.

5. The wireless charging system of claim 1, wherein said opening has an unbroken perimeter so said opening is fully encircled by said first surface element.

6. The wireless charging system of claim 1, wherein the perimeter of said opening has an open segment, so said opening is not fully encircled by said first surface element.

7. The wireless charging system of claim 1, wherein said opening comprises a first section and at least one connected extension section protruding from said first section forming a passage for a portion of said grip into which said portion may only be disposed after first being inserted through said first section.

8. The wireless charging system of claim 1, wherein said induction coil is disposed within a portion of said housing.

9. The wireless charging system of claim 1, wherein said induction coil is affixed to a portion of said first surface element of said housing.

10. The wireless charging system of claim 1, further comprising a securing mechanism affixed to a portion of said housing that frictionally engages said grip when said grip is inserted through said opening.

11. The wireless charging system of claim 1, wherein a portion of the perimeter of said opening frictionally engages and supports said grip when said grip is inserted through said opening.

12. The wireless charging system of claim 1, wherein said second surface element is disposed adjacent to said grip when said grip is inserted through said opening.

13. The wireless charging system of claim 12, wherein said second surface element frictionally engages said grip when said grip is disposed through said opening.

14. The wireless charging system of claim 1, wherein said first surface element is affixed to said second surface element by one or more bridge members that frictionally engage said grip when said grip is disposed through said opening.

15. The wireless charging system of claim 1, further comprising an anchor receiver disposed on said second surface element to receive an anchor unit.

16. The wireless charging system of claim 15, further comprising an anchor unit affixed to said anchor receiver to secure said housing.

17. A method for wirelessly charging an electronic device, wherein the electronic device comprises a receiving coil and a protruding grip unconnected to a power supply for said electronic device, wherein said grip has a first end, the surface area of which is affixed flush to a surface of said electronic device, and a second distal end disposed opposite said first end at a distance from said surface of said electronic device, said method comprising:

providing a charging device including a housing having an opening through at least one surface of said housing into a cavity recessed into said housing, and a transmitter circuit, including an induction coil affixed to a portion of said housing;

creating a magnetic field by applying current to said induction coil;

inserting said grip into said opening so at least a portion of said grip is disposed in said cavity, said grip is not disposed between said receiving coil and said induction coil, and said receiving coil is in contact with said magnetic field;

inducing a current in said receiving coil through said magnetic field; and using said current to charge said electronic device.

18. The method of claim 17, further including the step of attaching said wireless charging device to a surface by an anchor mount attached to said housing.

19. The method of claim 17, further including the step of resting said grip on a surface adjacent said opening to secure said electronic device.

20. The method of claim 17, further including the step of securing said grip within said opening to secure said electronic device.

* * * * *